United States Patent
Brickey et al.

(10) Patent No.: US 7,236,303 B2
(45) Date of Patent: Jun. 26, 2007

(54) THERMOPLASTIC OPTICAL FEATURE WITH HIGH APEX SHARPNESS

(75) Inventors: Cheryl J. Brickey, Webster, NY (US); John E. Benson, Webster, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 129 days.

(21) Appl. No.: 10/868,083

(22) Filed: Jun. 15, 2004

(65) Prior Publication Data

US 2005/0275945 A1    Dec. 15, 2005

(51) Int. Cl.
*G02B 1/10*    (2006.01)
(52) U.S. Cl. .................... 359/582; 359/580
(58) Field of Classification Search ............ 359/613, 359/577, 580, 582, 601
See application file for complete search history.

(56) References Cited

U.S. PATENT DOCUMENTS

| | | | |
|---|---|---|---|
| 4,249,011 A | 2/1981 | Wendling | |
| 5,759,467 A | 6/1998 | Carter et al. | |
| 6,136,414 A | 10/2000 | Aizawa et al. | |
| 6,569,515 B2* | 5/2003 | Hebrink et al. | ............. 428/212 |
| 2001/0053075 A1 | 12/2001 | Parker et al. | |
| 2002/0154406 A1 | 10/2002 | Merrill et al. | |
| 2003/0108710 A1 | 6/2003 | Coyle et al. | |
| 2003/0207035 A1* | 11/2003 | Schmid et al. | ............. 427/318 |

FOREIGN PATENT DOCUMENTS

| | | |
|---|---|---|
| EP | 0 592 284 | 4/1994 |
| EP | 0 591 055 | 9/2003 |
| WO | 99/11735 | 3/1999 |

\* cited by examiner

*Primary Examiner*—Stephone B. Allen
*Assistant Examiner*—Joshua L. Pritchett
(74) *Attorney, Agent, or Firm*—Andrew J. Anderson; Paul A. Leipold (57) ABSTRACT

A method of forming an element of an imaging device and the element are disclosed. The method includes providing a first layer and a second layer. The method also includes extruding the first layer with the second layer, where the second layer has a melt flow that is at least 10% greater than a melt flow of the second layer. Moreover, the method includes forming a plurality of optical elements over a surface of the second layer.

33 Claims, 6 Drawing Sheets

THERMOPLASTIC OPTICAL FEATURE WITH HIGH APEX SHARPNESS

CROSS-REFERENCE TO RELATED APPLICATIONS

The present application is related to U.S. patent application Ser. No. (Ser. No. 10/868,689) entitled "OPTICAL FILM AND METHOD OF MANUFACTURE" to Bourdelais, et al. and filed concurrently herewith. The disclosure of this application is specifically incorporated herein by reference.

TECHNICAL FIELD

The embodiments described relate generally to elements of an imaging system, and more particularly to components that improve light efficiency in light valve imaging devices.

BACKGROUND

Light-valves are implemented in a wide variety of display technologies. For example, display panels are gaining in popularity in many applications such as televisions, computer monitors, point of sale displays, personal digital assistants and electronic cinema to mention only a few applications.

Many light valves are based on liquid crystal (LC) technologies. Some of the LC technologies are prefaced on transmittance of the light through the LC device (panel), while others are prefaced on the light traversing the panel twice, after being reflected at a far surface of the panel.

The LC material is used to selectively rotate the axes of the liquid crystal molecules. As is well known, by application of a voltage across the LC panel, the direction of the LC molecules can be controlled and the state of polarization of the reflected light selectively changed. As such, by selective switching of the transistors in the array, the LC medium can be used to modulate the light with image information. This modulation may be used to provide dark-state light at certain picture elements (pixels) and bright-state light at others, where the polarization state governs the state of the light. Thereby, an image is created on a screen by the selective polarization transformation by the LC panel and optics to form the image or 'picture.'

In many LCD systems, the light from a source is selectively polarized in a particular orientation prior to being incident on the LC layer. The LC layer may have a voltage selectively applied to orient the molecules of the material in a certain manner. The polarization of the light that is incident on the LC layer is then selectively altered upon traversing through the LC layer. Light in one linear polarization state is transmitted by a polarizer (often referred to as an analyzer) as the bright state light; while light of an orthogonal polarization state is reflected or absorbed by the analyzer as the dark-state light.

While LCD devices are becoming ubiquitous in display and microdisplay applications, there are certain drawbacks associated with known devices, their components and methods of manufacture. For example, in known structures the efficiency of light transmission to the final imaging surface is rather poor, and results in poor image quality.

What is needed therefore is a method and apparatus that overcomes at least the shortcomings of the known devices described above.

SUMMARY

In accordance with an illustrative embodiment, a method of forming an element of an imaging device includes providing a first layer and a second layer. The method also includes extruding the first layer with the second layer, where the second layer has a melt flow that is at least 10 percent greater than a melt flow of the first layer. Moreover, the method includes forming a plurality of optical elements over a respective surface of the first and the second layers. In addition, the first and second layers have substantially identical optical properties.

In accordance with an illustrative embodiment, an optical component includes a first layer and a second layer. The first layer and the second layer have substantially identical optical properties. The element includes a plurality of optical elements comprised of at least a portion of the first layer and of the second layer.

DEFINED TERMINOLOGY

In addition to their ordinary meaning and in the context of the example embodiments described herein, the following terms are defined presently. It is emphasized that the terms provided are intended merely to compliment or supplement their ordinary meaning, and thus are not limiting.

1. As used herein, "transparent" includes the ability to pass radiation without significant scattering or absorption within the material. In accordance with illustrative embodiments, "transparent" material is defined as a material that has a spectral transmission greater than 90%.

2. As used herein, the term "light" means visible light.

3. As used herein, the term "polymeric film" means a film comprising polymers; and as used herein the term "polymer" means homopolymers, co-polymers and polymer blends.

4. As used herein, the terms "optical gain", "on axis gain", or "gain" mean the ratio of output light intensity in a given direction, where the given direction is often normal to the plane of the film, divided by input light intensity. To wit, optical gain, on-axis gain and gain are used as a measure of efficiency of a redirecting film and can be utilized to compare the performance of light redirecting films.

5. As used herein, the term "curved surface" indicates a three dimensional feature on a film that has curvature in at least one plane.

6. As used herein, the term "wedge-shaped features" indicates an element that includes one or more sloping surfaces, and these surfaces may be combination of planar and curved surfaces.

7. As used herein, the term "optical film" indicates a relatively thin polymer film that changes the nature of transmitted incident light. For example, a redirecting optical film of an example embodiment provides an optical gain (output/input) greater than 1.0.

It is again emphasized that the referenced terminology is included for complement or supplement of the ordinary meaning of each term; and in no way limits the any example embodiment, which includes features described by one or more of the referenced terms.

BRIEF DESCRIPTION OF THE DRAWINGS

The invention is best understood from the following detailed description when read with the accompanying drawing figures. It is emphasized that the various features are not necessarily drawn to scale. In fact, the relative dimensions may be arbitrarily increased or decreased for clarity of discussion.

DETAILED DESCRIPTION

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known apparati and methods may be omitted so as to not obscure the description of the present invention. Such methods and apparati and methods are clearly within the contemplation of the inventors in carrying out the example embodiments. Wherever possible, like numerals refer to like features throughout.

Briefly, and as described in connection with example embodiments herein, a light redirecting layer has a first layer and a second layer. The first layer includes a lower surface that is relatively smooth, and thereby does not significantly frustrate the recycling of the light redirecting film by diffusing the light. The first layer also has an upper surface from which a plurality of optical elements is formed. Over this top surface, a second layer is disposed. The second layer is of a material that is nearly identically optically to the first layer, but which has physically properties that differ from the first layer. As will become clearer as the present description continues, among other benefits, the second layer allows the optical elements to be fabricated in a substantially uniform manner across the surface of the light redirecting layer with a high degree of replication of the molding pattern, and with certain beneficial optical properties as well.

In accordance with illustrative embodiments, a method of fabricating optical elements includes co-extruding the first layer with the second layer, where the second layer has a melt flow that is at least 10 percent greater than a melt flow of the first layer. The illustrative methods enable the formation of features in a more uniform manner over the top surface and for features having a desirable shape. Moreover, because of the properties of the first layer, a lower pressure may be applied to realize full replication of the final redirecting layer. Among other benefits, this provides for a greater uniformity of the final product and a smoother lower surface of the first layer.

Figure 1:
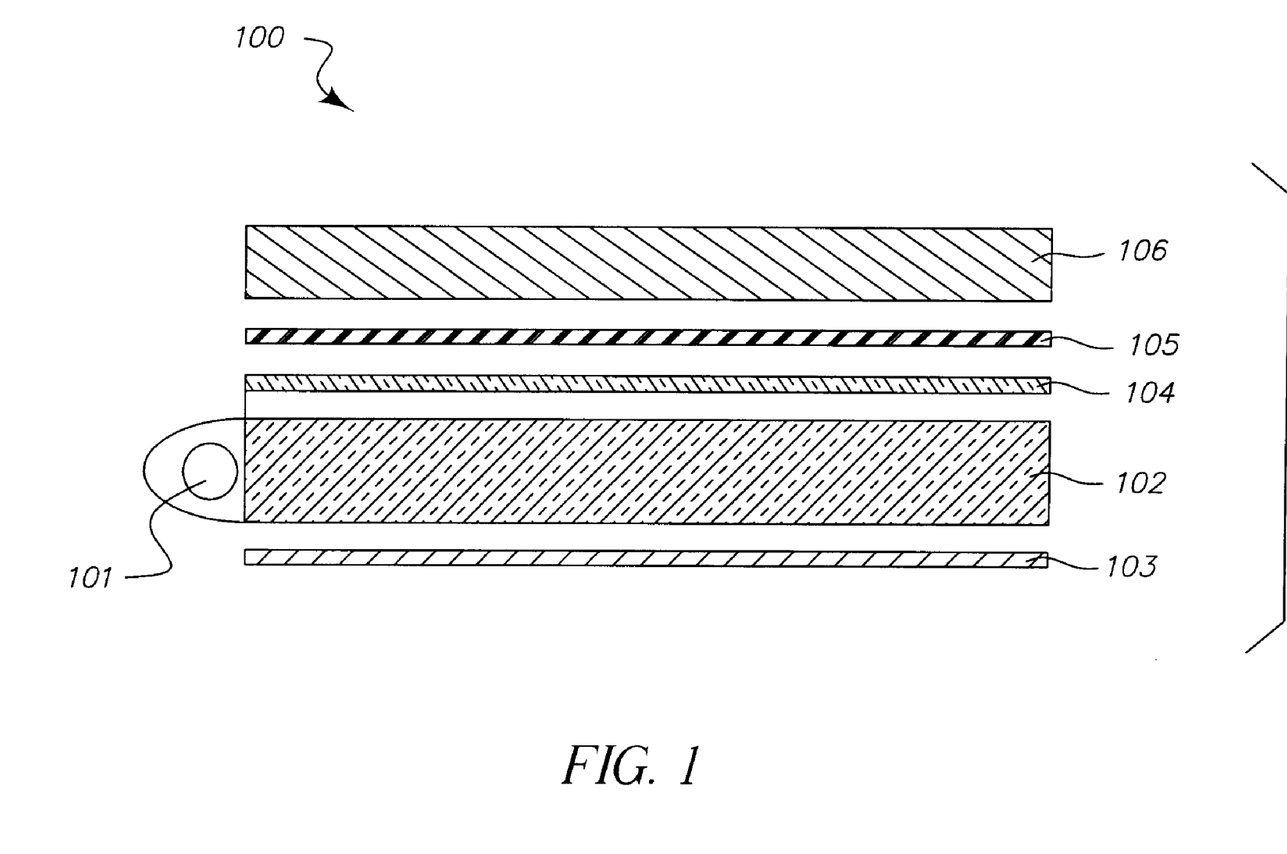
FIG. 1 is a cross-sectional view of an LCD including a backlight assembly in accordance with an illustrative embodiment.

FIG. 1 shows an imaging device 100, which includes an extruded multi-layer light redirecting polymeric layer 105 in accordance with an illustrative embodiment. In the present example embodiment, a light source 101 couples light to a light guide 102, which includes a diffusively reflective layer 103 disposed over at least one side as shown. The light source 101 is typically a cold cathode fluorescent bulb (CCFB), ultra-high pressure (UHP) gas lamp, light emitting diode (LED) array, or organic LED array. It is noted that this is merely illustrative and other sources suitable for providing light in a display device may be used.

Light from the light guide 102 is transmitted to an optional diffuser 104 that serves to diffuse the light, beneficially providing a more uniform illumination across the display surface (not shown), hide any features that are sometimes printed onto or embossed into the light guide, and reduce moire interference. As described in further detail herein, after the light passes through diffusive layer 104, it is incident on a light redirecting film 105, it emerges as a narrower cone compared to the light entering the film. The light redirecting layer 105 illustratively is oriented so the individual optical elements on a side that is closer to an LC panel 106.

Between the light redirecting layer 105 and the LC panel 106 other devices may be disposed such as another diffuser or a reflective polarizer (not shown). Moreover, another polarizer (often referred to as an analyzer) may be included in the structure of the LC display 100. As many of the devices of the display 100 are well-known to one of ordinary skill in the art of LC displays many details are omitted so as to not obscure the description of the example embodiments.

Figure 2A:
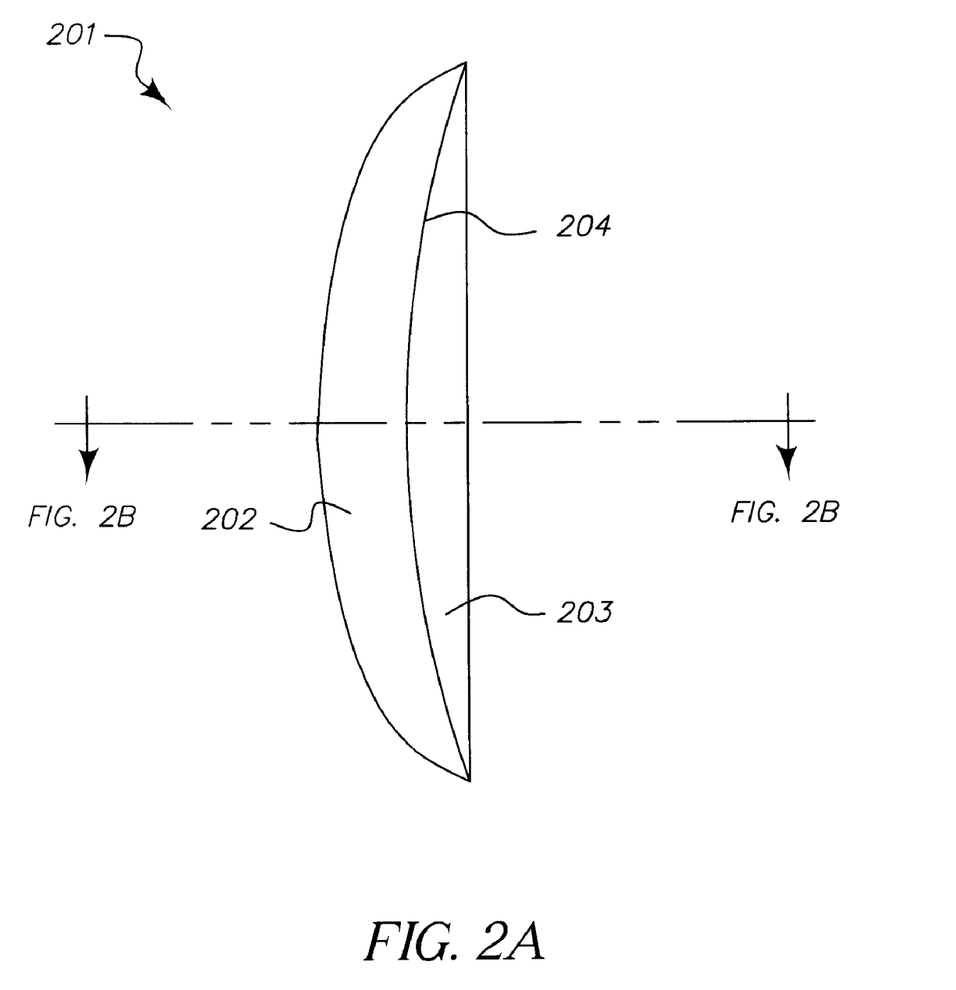
FIG. 2a is perspective view of a redirecting element in accordance with an example embodiment.

FIG. 2a is a perspective view of an optical element 201, which would be disposed at a top surface of the light redirecting layer (e.g., layer 105) according to an example embodiment. Of course, this is but one of a plurality of similar elements of the light redirecting layer 105. In the present example embodiment, the element 201 is a curved wedge shape having a curved surface 202 and a planar surface 203. The curved surface 202 can have curvature in one, two, or three axes and serves to redirect the light one or more directions, as described more fully herein. The two surfaces 202 and 203 meet at a ridge 204. Illustratively, the ridge 204 is the linear apex formed where the surfaces 202 and 203 of the element 201 meet.

It is noted that the shape of the element 201 is merely illustrative, and that elements of a variety of shapes other than the curved wedge shape can be used. Beneficially, the elements having different shapes than those of FIG. 2a include the useful aspects of the apex and sides 202, 203 for redirecting light and recycling light that would otherwise be lost as described in connection with certain illustrative embodiments. Of course, in order to realize the structures having the reduced landing and the substantial uniformity, it is useful to provide a skin layer as described herein.

Figure 2B:
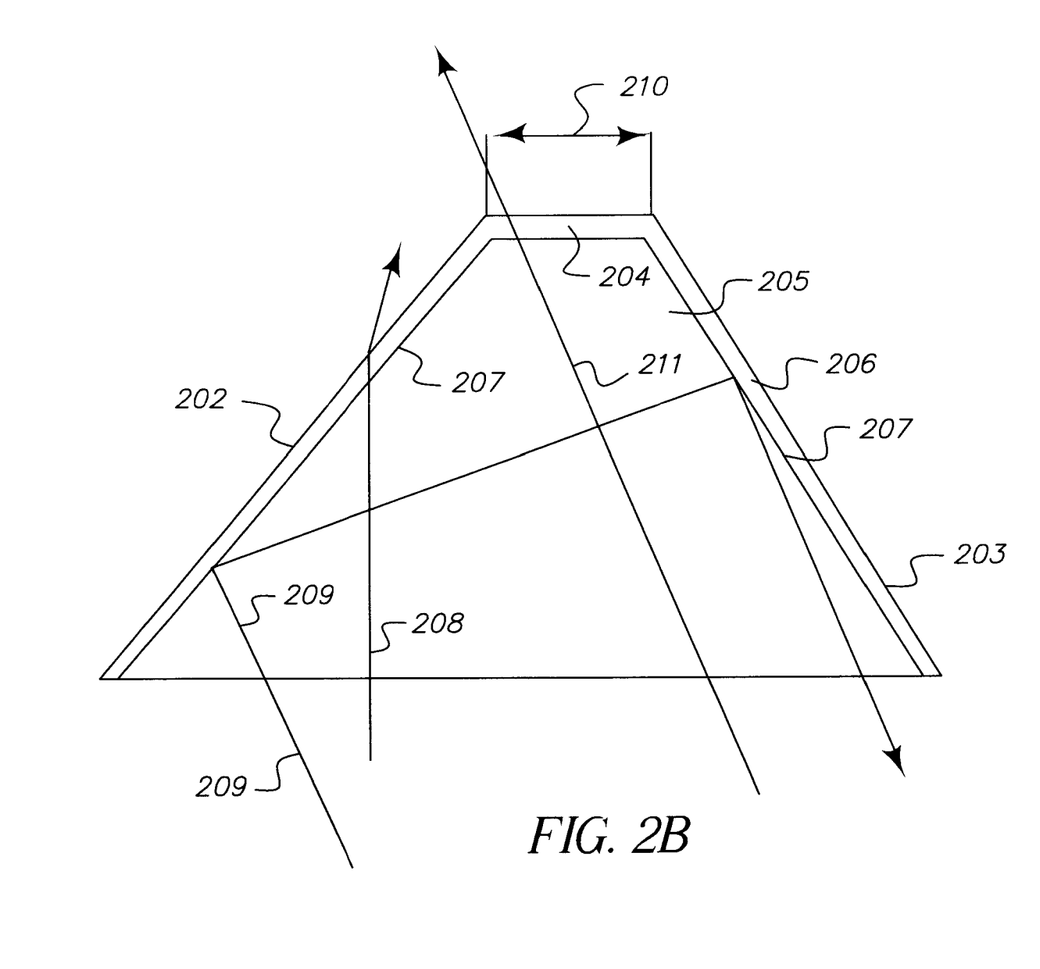
FIG. 2b is a cross-sectional view of a redirecting element taken along the line 2b—2b.

FIG. 2b shows the element 201 in cross-section at the line 2b—2b of FIG. 2a. As described in further detail herein, the element 201 is comprised of a first layer 205, and at least a second layer 206 disposed thereover. The first layer 205 is of a material having a relatively high index of refraction relative to the medium in which it is disposed (e.g., air). This relatively high index of refraction is beneficial in refracting light to collimate it or to recycle it. The element 201 includes side surfaces 207 and the ridge 204. Of course, the second layer 206, being disposed over the first layer also has substantially identical surfaces. According to an illustrative embodiment, the second layer 206 is of a material that is substantially identical optically to the material of the first layer 205. However, and as described in further detail herein, certain physical properties of the second layer 206 are significantly different than those of the first layer 205. For example, the first layer 205 and the second layer 206 are of materials that have substantially the same index of refraction $n_r$, each have a light transmission of at least 85% transmission/unit thickness, and each have similar coloration and haze properties.

Ultimately, this combination of properties fosters an optical transition from one layer to the next that is substantially without unwanted reflection; and provides a uniformity of replication and improved optical characteristics.

As described in further detail herein, the first layer 205 is a polycarbonate layer, and the second layer is a polycarbonate layer having certain optical properties that are substantially the same as those of the first layer. In this illustrative embodiment, the second layer has a thickness of approximately 2 µm to approximately 100 micrometers; and the first layer has a thickness of approximately 10 to approximately 200 micrometers. In some embodiments the second layer has a thickness that is at most approximately 10% of an average height of the optical element.

The surfaces 202 and 203 beneficially provide of approximately 45° interface with the surrounding medium, which may be air or another film (not shown). Of course, it is noted that this is not essential, and the interface may be other than 45°. Moreover, it is beneficial that the features of the element have a cross section indicating a 90° included angle at the highest point (apex) of the feature. It is noted that in the likely case that a land (as opposed to a point) is the highest point (e.g., as shown in FIG. 26), this included angle is measured at the intersection of the projection of the sides 207.

In an illustrative embodiment, a 90 degree peak angle is beneficial because it produces the highest on-axis brightness for the-light redirecting film. It is noted that an angle of approximately 88° to 92° produces similar results and can be used with little to no loss in on-axis brightness. Further, when the angle of the apex is less than approximately 85° or greater than approximately 95°, the on-axis brightness for the light redirecting film decreases.

As alluded to above, one benefit of the structure of the element 201 lies in its ability to substantially collimate light that has a relatively low angle of incidence relative to the sides 202, 203; and to recycle the light that has a relatively high angle of incidence. To this end, randomly polarized light 208, which is incident at a relatively high angle to the side 203 is refracted toward the surface 203 and is provided to the LC panel 106 in a greater state of collimation. However, light 209, which has a relatively low angle of incidence is reflected and ultimately returned toward the light guide 103. Ultimately, a portion of this light 209 will be again incident on the element 101 or its diffusive reflector 103, and may then be recycled as diffuse, randomly polarized light that improves the efficiency and thus the performance of the imaging device 100 such that the light exiting the light redirecting film exits in a more narrow cone than the light entering the light redirecting film. As can be readily appreciated, but for the element 201, light 209 would not have benefited the on-axis viewing of the LC display due to its relatively low angle of incidence. To wit, light 209, if not reflected as shown, would be well outside the acceptance of the LC panel 106, or the other elements of the imaging display. This loss of light will deleteriously impact the light efficiency from the light source 101 to the imaging surface (not shown). Ultimately, this will adversely impact the quality of the image, particularly when viewed nearly on-axis.

In addition to the beneficial characteristics of the geometric relationship of the sides 202 and 203 of the element 201, the width or land 210 of apex 204 also impacts the efficiency of light transmitted from the light source 101 to the LC panel 106, and thus affects the quality of the image provided by the imaging system. To this end, the width 210 of the apex is ideally a point formed by the convergence of the two sides 202 and 203. However, manufacturing limitations often prevent a true point. Rather, a land 210 that is flat or rounded may result. Such a land has substantially no optical impact on light incident thereon. For example, light 211 is lost due to the lack of optical power at the land 210. Thus, it is advantageous to minimize the width 210 as much as possible. Stated a bit differently, it is beneficial to minimize the contribution of the apex 204 to the surface area of the element 201. The greater the portion of the surface area that is from the apex, the less effective the element 201 is at redirecting light towards the normal to the plane of the film.

Moreover, it is useful to maintain the uniformity of the magnitude of the width 210 across a layer comprised of a plurality of elements to less than a certain deviation. This uniformity is beneficial to the quality of the image because of the exceptional ability of the human eye to detect differences of greater than approximately 0.75 µm. In accordance with an illustrative embodiment, the width or land 210 has a magnitude of approximately 0.25 µm to approximately 0.75 µm, and a deviation of approximately ±0.5 µm across a layer comprised of a plurality of elements. It is noted that the dimensions provided are merely illustrative. For example, the width 210 may be approximately 0.20 µm, if not smaller. Moreover, the width 210 may be greater than 0.75 µm; however, as the width approaches 3.0 µm, the optical property of on-axis brightness of the element 201 is substantially lost. Finally, it is noted that the structure of the element 201 may include a more rounded ridge and less defined intersections than are shown in FIG. 2b. Optimally, the structure has a width 210 as small as possible.

Figure 3:
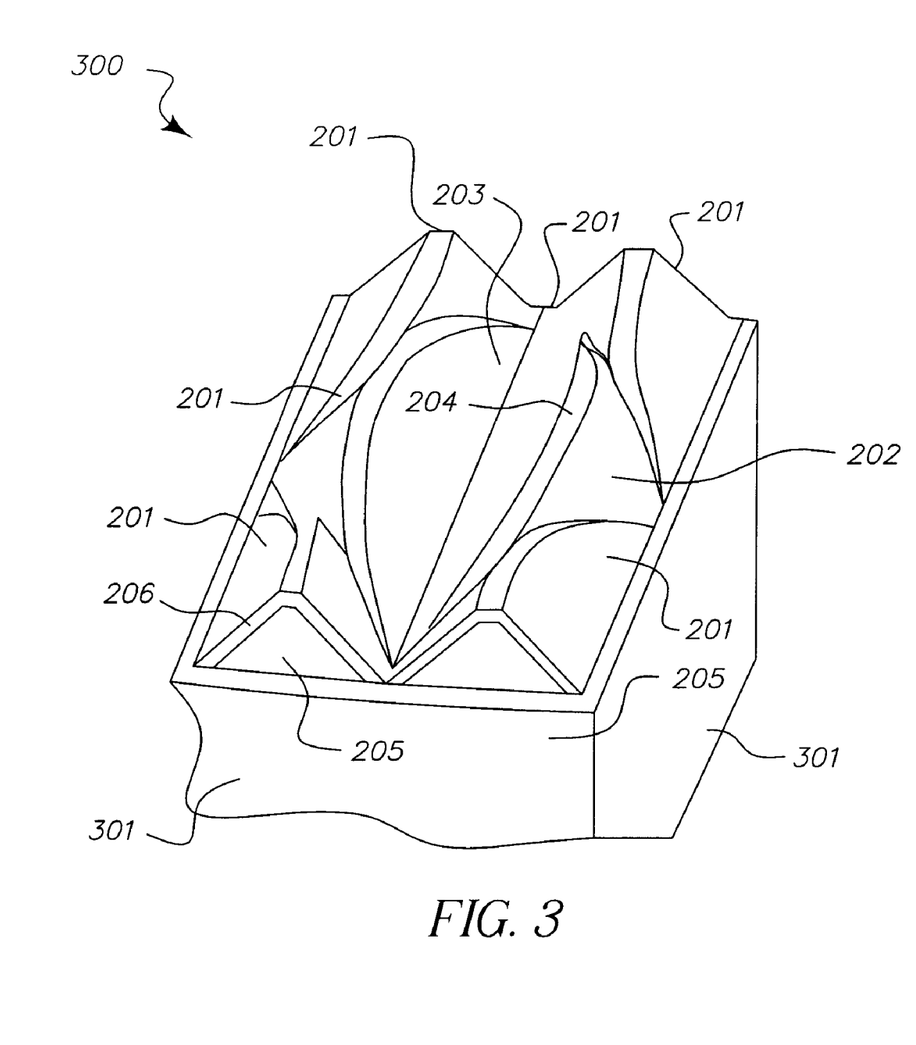
FIG. 3 is a redirecting layer in accordance with an example embodiment.

FIG. 3 is a perspective view of a portion of a redirecting layer 300 in accordance with an example embodiment. The redirecting layer 300 includes a plurality of elements 201 described in connection with the example embodiments of FIGS. 2a and 2b. The elements are formed from the first layer 205 and the second layer 206 as described above. To wit, the redirecting layer 300 has a substrate and plurality of elements 201 that are formed from the first layer; and a skin layer that is formed from the second layer 206. As described in detail herein, the skin layer 206 enables the fabrication of a plurality of elements 201 with a uniformity in the width 210 and surfaces 202 and 203 over one surface 302 of the layer 300, and the fabrication of another surface 301, which is smooth and which is on an opposite side of the layer 302.

In the example embodiments of FIGS. 2a–3, elements 201 are a curved wedge shaped elements and are randomly placed and parallel to each other. This causes the ridges 204 to be generally aligned in the same direction. To this end, it is beneficial to have the ridges generally aligned so that the layer collimates light in substantially one direction (e.g., the axis of an image plane) thereby creating higher on-axis gain in a liquid crystal backlight structure of an illustrative embodiment. Alternatively, the surfaces 202, 203 have a certain curvature. This curvature can be in the plane of the layer 300, perpendicular to the plane of the layer 300, or both. Thus, it may useful to have elements 201 with curvature in the plane of the film such that the elements can collimate in more than one direction As can be readily appreciated, the curvature of the ridge 204 ridge forms an elliptical arc, such as a part of a circle or an ellipse. The radius of curvature is illustratively a segment of a circle. The radius of curvature determines how much light is refracted in each direction and how much moire and on-axis brightness the layer 300 will provide. Additionally, the wedge shaped elements 201 on the light redirecting layer 300 have pitch or angular orientation that are varied relative to the dimensions, pitch or angular orientation of the pixels or other repeating elements such that moire interference patterns are not visible through the LCD panel.

In an illustrative embodiment, the optical elements 201 are randomly oriented relative to one another to reduce or significantly eliminate any interference with the pixel spacing of a liquid crystal display. This 'randomization' can include the size, shape, position, depth, angle or density of the optical elements. This eliminates the need for diffuser layers to defeat moire and similar effects. Also, at least some of the individual optical elements may be arranged in groupings across the exit surface of the films, with at least some of the optical elements in each of the groupings having a different size or shape characteristic that collectively produce an average size or shape characteristic for each of the groupings that varies across the films to obtain average characteristic values beyond machining tolerances for any single optical element and to defeat moire and interference effects with the pixel spacing of a liquid crystal display. In addition, at least some of the individual optical elements may be oriented at different angles relative to each other for customizing the ability of the films to reorient/redirect light along two different axes.

Figure 4:
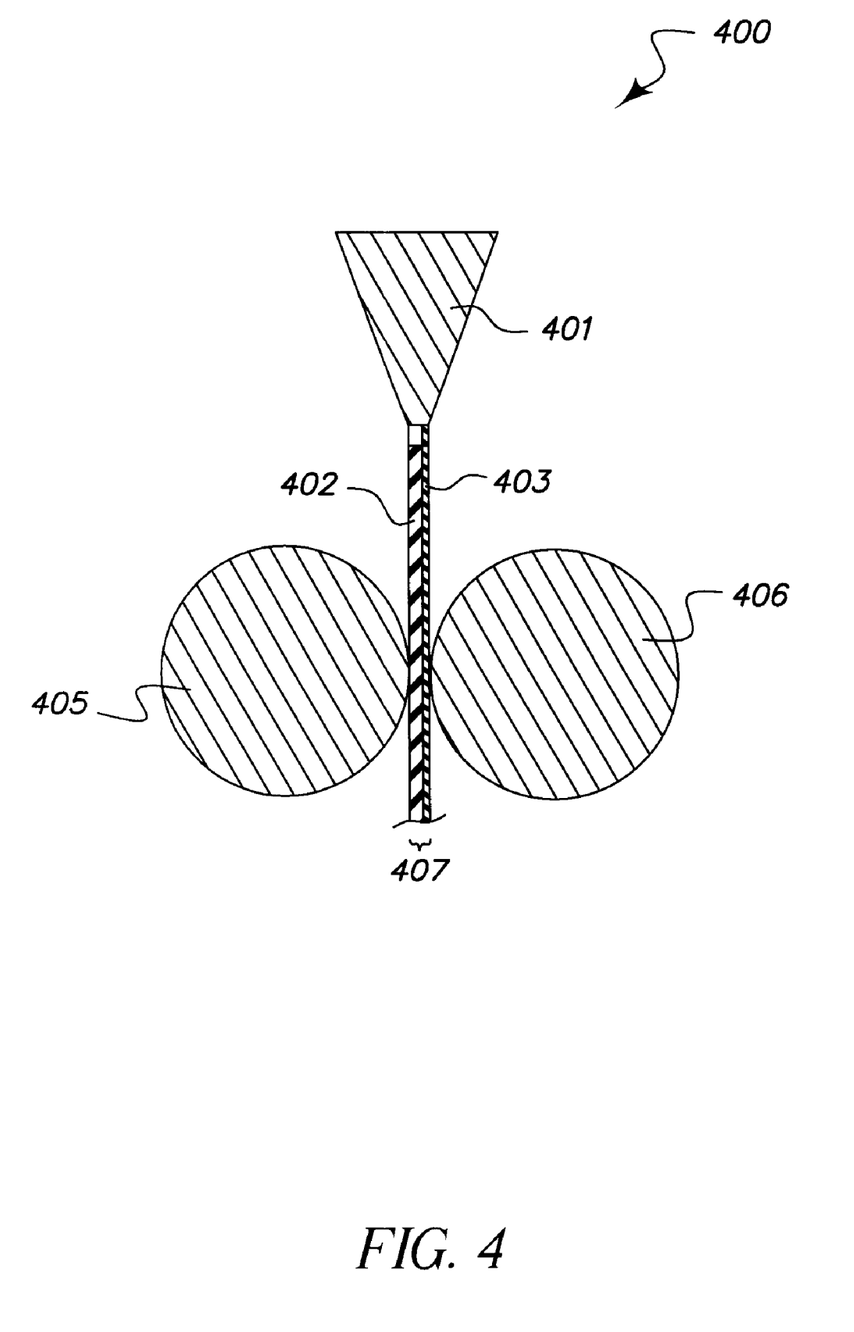
FIG. 4 is a cross-sectional schematic view of an apparatus for forming a collimation layer in accordance with an example embodiment.

FIG. 4 is a cross-sectional schematic view of an apparatus 400 used for forming a light redirecting layer in accordance with an example embodiment. The apparatus 400 includes a nip 401 that extrudes a first material 402 and a second material 403. The first material 402 is on one side and the second material 403 is on the other side of the nip 401. The co-extruded layers 402 and 403 are then subjected to pressure by a first roller 405 and a second roller 406. The first roller 405 is in contact with the first layer 402 and forms the substantially smooth surface 301 of the layer 300 previously described. The second roller 406 has a patterned surface (not shown) that forms the pattern of the plurality of elements 201 of the illustrative embodiments. After passing through the rollers 405, 406, a layer 407 is formed. This layer 407 includes the features of layer 300 of the illustrative embodiment, and may be used as a light redirecting layer.

The first layer 402 is illustratively a material that has a variety of desirable properties from both from the perspective of manufacturing and optical performance. For example, the first layer 402 is substantially transparent; provides UV stability; has an acceptable hardness for display applications; has a relatively high mechanical modulus; and can be extruded monolayer or mutlilayer. Moreover, the first layer 402 is of a material that has optical properties, such as those mentioned above, and which are substantially the same as the optical properties of the second layer 403.

In an illustrative embodiment, the first layer 402 is a polycarbonate material that has a high optical transmission value (i.e., is transparent) and is durable. This durability of polycarbonate makes the light redirecting layer of an illustrative embodiment less prone top scratching than known light redirecting films that are made of more fragile and brittle materials, such as UV cured polyacrylate. Polycarbonates are available in grades for different applications and some are formulated for high temperature resistance, excellent dimensional stability, increased environmental stability, and lower melt viscosities. The ultimate characteristic is a useful characteristic of the second material 403. Beneficially, and as described in greater detail herein, a melt flow rate of the second layer 403 is at least approximately 10% greater than a melt flow rate of the first layer 402 during fabrication.

In another example embodiment, the first layer 402 comprises an olefin-repeating unit. Polyolefins are low in cost and have good strength and surface properties. In another embodiment of the invention the substrate comprises a cellulose acetate. Illustrative polymers include polyester (such as PET and PEN), and cast polyolefins such as polypropylene and polyethylene, polystyrene, acetate and vinyl.

Thermoplastics are useful because they are inexpensive and readily processed. UV cured materials sometimes suffer from lower environmental stability and need to be coated onto a preformed substrate. In addition to the complexity of manufacture, UV coatings are susceptible to curling and other deleterious aspects.

The second material 403 forms the second layer (e.g., second layer 206) or the skin layer according to an example embodiment. The second material is chosen for its beneficial manufacturing aspects, particularly its viscosity at the point of extrusion. To this end, one difficulty that plagues known fabrication methods and their resultant optical films is the inability to form the pattern (e.g., a pattern of optical elements) in high replication uniformly over a layer. In many known methods, it is necessary to apply a significant amount of pressure (e.g., 13.8 MPa to 20.7 MPa) to replicate the pattern. However, pressures this great used in known methods result in non-uniformity across the patterned side, and roughness in the back side. In all, the amount of useful layer is less than desirable. Moreover, high pressures result in increased repairs on the apparatus 400.

Contrastingly, the use of the second material 403 allows the pressure applied by the rollers 404 and 405 to be reduced in some embodiments 25% compared to the referenced pressures of known techniques, while providing an excellent pattern. To wit, the second material 403 is more readily formable due to its pliability at the extrusion temperatures. This results in features such as the apex or ridge, and side surfaces having dimensions and uniformity across the layer described above. Furthermore, the backside or smooth surface (e.g., 301) is relatively low in surface roughness, which can adversely impact the recycling properties. The roughness of the smooth surface in some embodiments is less than 50 nanometers.

In an illustrative embodiment, the second material 402 has optical properties that are substantially the same as those of the first material 403. For example, the index of refraction of the second material 402 is on the order of approximately ±0.1 to approximately ±0.3 of the index of refraction of the first material. Usefully, the indices of refraction of the first and second layers are the substantially identical. As referenced previously, the index matching improves the efficiency of the light transmitted to the LC panel or image plane by reducing reflection.

One method to match the index of refraction of the second layer to the first layer is to include $TiO_2$ particles having a mean particle size of less than 30 nanometers. The $TiO_2$ is polymerized insitu prior to the extrusion of the layer 403, and is utilized to increase the index of refraction of the polymer element.

It is noted that well dispersed $TiO_2$ in a bulk polymer can be produced with high transmission, low color, and increased high index of refraction as compared to the bulk polymer of the layer. Nanoparticles beneficially increase the index of refraction because they can influence index of refraction without significantly changing the scattering properties of the optical element. Illustratively, the index of refraction of the optical element changes by at least approximately 0.02 from the base polymer, in this case polycarbonate. This increase in refraction increases performance of the optical element and even an increase of 0.02 in index of refraction yields optical benefits. Beneficially, the index of refraction of the optical element changes by at least 0.1 from the base polymer. Nano-TiO2 added to the second layer can tailor the index of refraction of the second layer to substantially match the first layer index of refraction thus minimizing any internal reflections at the interface between the two layers.

It is noted that index matching the first and second materials is useful in applications where it is desirable to redirect and recycle light, or where reflections and total internal reflection are to be minimal. However, the substantial matching of the indices is not essential to carrying all embodiments. To wit, it is clearly within the purview of the example embodiments to have significant differential in the index of refraction between the two layers. Naturally, the high degree of uniformity and quality of the features formed in relatively low-pressure extrusion methods of the example embodiments will benefit high-differential index layers as well.

In an illustrative embodiment, the second material 403 has a melt flow rate that is on the order of at least approximately 10% greater than the first material 402, as measured by the ASTM D1238 melt flow standard at 300° C. Additionally, the melt flow rate of the second material 403 may be approximately 200% to approximately 300% greater than the melt flow rate of the first material 402, measured by the same standard. In one example embodiment, the second material 403 is a layer of polycarbonate having a melt flow rate of on the order of approximately melt flow rate of approximately 60 g/10 min to approximately 90 g/10 min. Illustratively, the first layer 402 is a polycarbonate having a melt flow rate of approximately 5 g/10 min. to approximately 55 g/10 min.

In an illustrative embodiment, the index of refraction of the first material 402 (thus the first layer 205) is between approximately 1.59 and approximately 1.69. As can be appreciated, the greater the index of refraction of the elements 201 light redirection towards the normal to the film surface.

Figure 5:
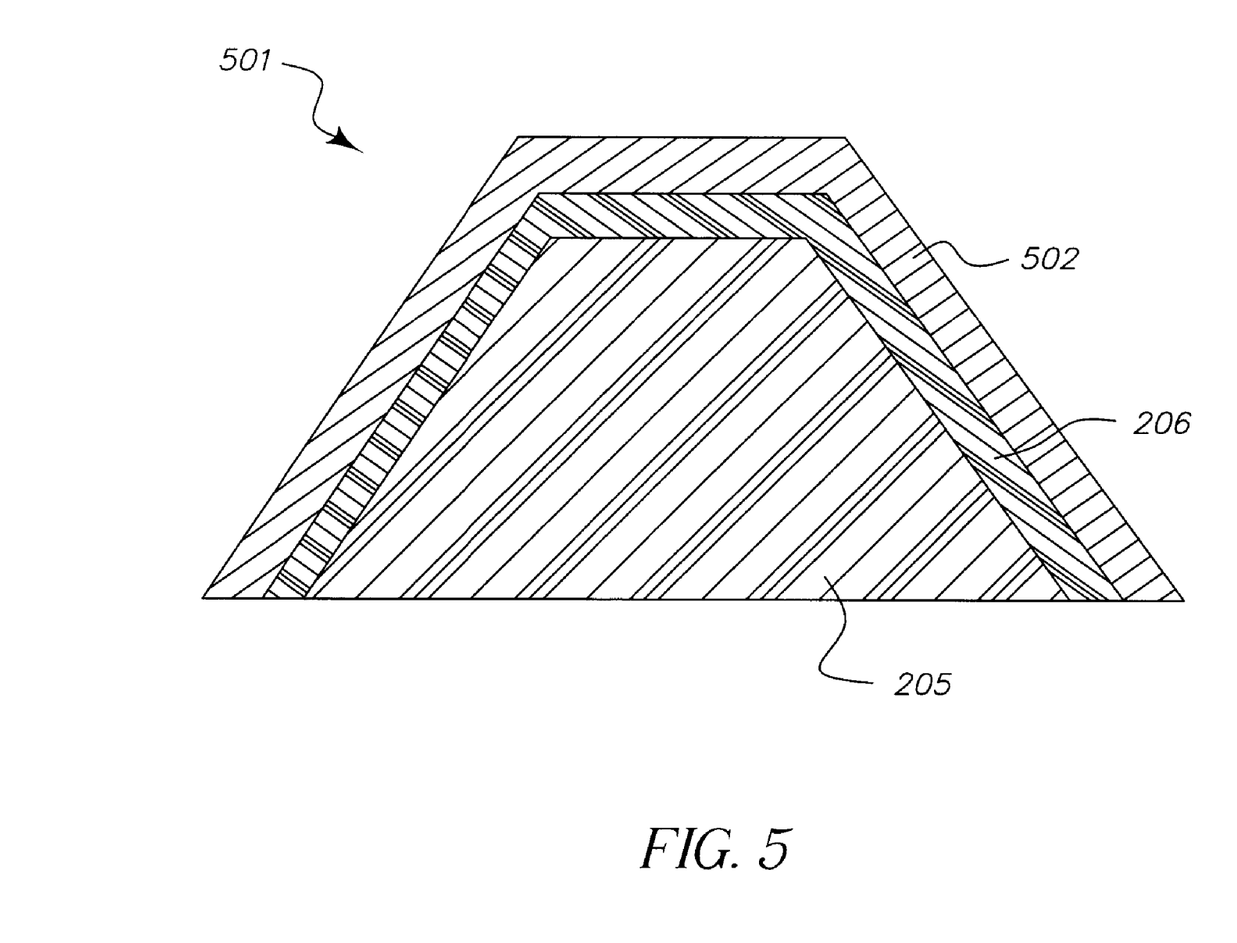
FIG. 5 is a cross-sectional view of another redirecting element including at least one other layer in accordance with an example embodiment.

FIG. 5 is a cross-sectional view of an optical element 501 according to another illustrative embodiment. The element 501 is substantially identical in structure to element 201 previously described, and as such many details of its structure and fabrication are not repeated. It is noted, however that layers 205 and 206 may differ in form and function to those previously described Optical element 501 includes the first layer 205, the second layer 206 and a third layer 502, which is extruded in the illustrative method previously described. Layer 502 may be another optical layer having beneficial chemical, optical, electrical or mechanical properties. For example layer 502 to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, or substrates designed to improve the mechanical integrity or strength of the film or device. Layer 502 can also be utilized to improve release from the patterned roll, thereby improving the replication and quality of the light redirecting film.

In addition, the layer 502 may be antistatic coatings or films. Such coatings or films include, for example, $V_2O_5$ and salts of sulfonic acid polymers, carbon or other conductive metal layers.

In addition, layer 502 may be between layers 205 and 206 to provide adhesion between the layers or other mechanical or optical purposes.

Finally, it is noted that in many cases, the materials desired for use as optical elements may be expensive. One beneficial aspect of the example embodiments is the ability to provide only a thin layer of the expensive material to form the desired structure. For example, layer 206 may be of an expensive material compared to layer 205. As such, by requiring only a thin layer, significant savings can be realized.

In accordance with illustrative embodiments, optical light redirectors and their methods of manufacture have been described. It is emphasized that the various methods, materials, components and parameters are included by way of example only and not in any limiting sense. Therefore, the embodiments described are illustrative and are useful in providing beneficial backlight assemblies. In view of this disclosure, those skilled in the art can implement the various example devices and methods to effect improved backlight efficiency, while remaining within the scope of the appended claims.

What is claimed is:

1. A method of forming an element of an imaging device, the method comprising:
   providing a first layer and a second layer;
   extruding the first layer with the second layer, wherein the second layer has a melt flow that is at least 10% greater than a melt flow of the first layer; and
   forming a plurality of optical elements over respective surfaces of the first and the second layers, and wherein the first layer and the second layer have substantially identical optical properties.

2. A method as recited in claim 1, wherein the method further comprises forming at least a third layer over the second layer or beneath the second layer.

3. A method as recited in claim 1, wherein the optical properties are one or more of: index of refraction, coloration, haze and light transmission.

4. A method as recited in claim 1, wherein the method further comprises applying pressure to the first layer and second layer to form the plurality of optical elements on a side of the device.

5. A method as recited in claim 1, wherein the second layer has a melt flow of approximately 200% to approximately 300% greater than the flow rate of the first layer.

6. A method as recited in claim 5, wherein the second layer has a melt flow of approximately 60 g/10 min to approximately 90 g/10 min.

7. A method as recited in claim 5, wherein the first layer has a melt flow rate of approximately 5 g/10 min. to approximately 55 g/10 min.

8. A method as recited in claim 1, wherein at least one of the plurality of optical elements has a first side and a second side that are each oriented at approximately 45° relative to a surrounding medium.

9. A method as recited in claim 8, wherein the surrounding medium is air.

10. A method as recited in claim 8, wherein the first and second layers have an index of refraction that is substantially the same, and the surrounding medium has an index of refraction that is less that the index of refraction of the first and second layers.

11. A method as recited in claim 1, wherein each of the plurality of optical elements have an apex having a width of approximately 0.25 μm to approximately 0.75 μm.

12. A method as recited in claim 11, wherein a deviation in the widths of the apexes across a layer is in the range of approximately ±0.5 μm.

13. A method as recited in claim 12, wherein the layer is a light-redirecting layer.

14. A method as recited in claim 1, wherein each of the plurality of optical elements is substantially wedge-shaped.

15. A method as recited in claim 1, wherein the imaging device is a liquid crystal display device.

16. A method as recited in claim 1, wherein each of the plurality of optical elements has at least one curved side and a ridge.

17. An optical component, comprising:
a first layer including a relatively smooth lower surface and an upper surface;
a second layer disposed over the upper surface of the first layer, having optical properties that are substantially the same as the first layer, wherein the second layer comprise a material having a melt flow that is at least 10% greater than a melt flow of the first layer; and
a plurality of optical elements formed from the upper surface of the first layer and comprised of at least a portion of the first layer and of the second layer.

18. An optical component as recited in claim 17, wherein the plurality of optical elements are light redirecting elements.

19. An optical component as recited in claim 18, wherein each of the plurality of optical elements includes a substantially curved ridge.

20. An optical component as recited in claim 19, wherein the ridge forms an elliptical arc.

21. An optical component as recited in claim 17, wherein the optical properties are one or more of: index of refraction, coloration, haze and light transmission.

22. An optical component as recited in claim 17, further comprising at least a third layer over the second layer or beneath the second layer.

23. An optical component as recited in claim 17, wherein the second layer has a melt flow of approximately 200% to approximately 300% greater than the flow rate of the first layer.

24. An optical component as recited in claim 23, wherein the optical properties are one or more of: index of refraction, coloration, haze and light transmission.

25. An optical component as recited in claim 17, wherein at least one of the optical elements includes a first side and a second side that are each oriented at approximately 45° relative to the surrounding medium.

26. An optical component as recited in claim 25, wherein an included angle between the first and second sides is approximately 90°.

27. An optical component as recited in claim 17, wherein each of the optical elements has an apex having a width in the range of approximately 0.25 μm to approximately 0.75 μm.

28. An optical component as recited in claim 27, wherein a deviation in the widths of the apexes across a layer of the optical component is in the range of approximately ±0.5 μm.

29. An optical component as recited in claim 17, wherein the first layer has a first thickness and the second layer has a second thickness that is substantially smaller than the first thickness.

30. An optical component as recited in claim 29, wherein the second thickness is at most 10% of an average height of the optical element.

31. An optical component as recited in claim 17, wherein the first layer is of a first material and the second layer is of a second material.

32. An optical component as recited in claim 17, wherein 16, the second layer has a melt flow of approximately 60 g/10 min to approximately 90 g/10 min.

33. An optical component as recited in claim 17, wherein the first layer has a melt flow rate of approximately 5 g/10 min. to approximately 55 g/10 min.

* * * * *